(12) United States Patent
Case (10) Patent No.: US 8,321,131 B2
(45) Date of Patent: Nov. 27, 2012

(54) RADIAL DENSITY INFORMATION FROM A BETATRON DENSITY SONDE

(75) Inventor: Charles R. Case, West Redding, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/957,125

(22) Filed: Dec. 14, 2007

(65) Prior Publication Data

US 2009/0157317 A1    Jun. 18, 2009

(51) Int. Cl.
 *G01V 1/40* (2006.01)
 *G01V 3/18* (2006.01)
 *G01V 5/04* (2006.01)
(52) U.S. Cl. ............... 702/11; 702/12; 702/13
(58) Field of Classification Search ............ 702/11, 702/12, 13; 73/152.05; 324/332, 333, 344
See application file for complete search history.

(56) References Cited

U.S. PATENT DOCUMENTS

| | | | |
|---|---|---|---|
| 3,235,729 A * | 2/1966 | Scherbatskoy | 250/268 |
| 3,321,625 A | 5/1967 | Wahl | |
| 3,333,238 A * | 7/1967 | Caldwell | 340/855.3 |
| 3,564,251 A * | 2/1971 | Youmans | 250/269.1 |
| 3,975,689 A | 8/1976 | Geizer et al. | |
| 3,976,879 A * | 8/1976 | Turcotte | 250/266 |
| 3,979,300 A | 9/1976 | Paap et al. | |
| 3,996,473 A | 12/1976 | Culver | |
| 4,093,854 A * | 6/1978 | Turcotte et al. | 376/118 |
| 4,506,156 A | 3/1985 | Mougne | |
| 4,577,156 A | 3/1986 | Kerst | |
| 4,715,019 A * | 12/1987 | Medlin et al. | 367/31 |
| 4,823,044 A | 4/1989 | Falce | |
| 5,077,530 A | 12/1991 | Chen | |
| 5,122,662 A | 6/1992 | Chen et al. | |
| 5,282,133 A * | 1/1994 | Watson | 702/8 |
| 5,293,410 A | 3/1994 | Chen et al. | |
| 5,319,314 A | 6/1994 | Chen | |
| 5,326,970 A * | 7/1994 | Bayless | 250/269.1 |
| 5,426,409 A | 6/1995 | Johnson | |
| 5,525,797 A | 6/1996 | Moake | |
| 5,528,495 A * | 6/1996 | Roscoe | 702/8 |
| 5,680,018 A | 10/1997 | Yamada | |
| 5,745,536 A | 4/1998 | Brainard et al. | |
| 5,804,820 A | 9/1998 | Evans et al. | |

(Continued)

FOREIGN PATENT DOCUMENTS

GB        2179442 A    3/1987

(Continued)

OTHER PUBLICATIONS

Office Action of Japanese Application Serial No. 2010-503283 dated Dec. 20, 2011.

(Continued)

*Primary Examiner* — Janet Suglo (57) ABSTRACT

An apparatus and a method for determining characteristics of earth formations traversed by a borehole that compensates the mudcake and standoff effects with fewer than usual detectors. The apparatus includes an radiation source effective to generate first and, spatially as well as temporally separate, second X-rays for irradiating earth formations from first and second entrance angles, one or more X-ray detectors capable of generating a first and a second signal indicative of the intensity of the first and second X-rays returned from earth formations to the detectors and a housing accommodating the radiation source and the detectors.

17 Claims, 6 Drawing Sheets

U.S. PATENT DOCUMENTS

| | | | |
|---|---|---|---|
| 5,841,135 A * | 11/1998 | Stoller et al. | 250/269.3 |
| 5,912,460 A | 6/1999 | Stoller et al. | |
| 6,121,850 A | 9/2000 | Ghoshal | |
| 6,201,851 B1 | 3/2001 | Piestrup et al. | |
| 6,441,569 B1 | 8/2002 | Janzow | |
| 6,713,976 B1 | 3/2004 | Zumoto et al. | |
| 6,725,161 B1 * | 4/2004 | Hillis et al. | 702/6 |
| 6,925,137 B1 | 8/2005 | Forman | |
| 7,148,613 B2 | 12/2006 | Dally et al. | |
| 2003/0106993 A1 * | 6/2003 | Chen et al. | 250/269.1 |
| 2006/0261759 A1 | 11/2006 | Chen et al. | |

FOREIGN PATENT DOCUMENTS

| | | |
|---|---|---|
| JP | 43-016582 | 7/1968 |
| JP | 62044680 A | 2/1987 |
| JP | 4055790 A | 2/1992 |
| JP | 05052734 A | 3/1993 |
| JP | 06-037748 | 5/1994 |
| JP | 8195300 A | 7/1996 |
| WO | 2007110795 A1 | 10/2007 |

OTHER PUBLICATIONS

Ellis et al., "Chapter 13.4.5: Characteristic Times," "Chapter 13.5: Neutron Detectors" and "Chapter 14: Neutron Porosity Devices," Well Logging for Earth Scientists, Springer: the Netherlands, 2007: pp. 344-349 and 351-381.

* cited by examiner

RADIAL DENSITY INFORMATION FROM A BETATRON DENSITY SONDE

BACKGROUND OF THE INVENTION

1. Field of the Invention

This disclosure relates to formation density logging, and more particularly to methods and apparatus for determining the densities of earth formations surrounding a borehole that compensate for the effects of mudcake and standoff.

2. Background of the Invention

A probe, known as a sonde, is lowered into an oil well borehole and used to determine the formation density surrounding the borehole. Formation density is used by Geologists to predict the depth levels of productive flows of oil. Conventional logging sondes include a source of gamma rays (or X-rays), at least one detector and a material that shields the detector from the radiation source to prevent counting of radiation emitted directly from the source. During operation of the sonde, gamma rays are emitted from the radiation source and travel through the wall of the borehole and into the formation to be studied. These gamma rays interact with the atomic electrons of the formation; and in the Compton scattering process, some of the photons emitted from the source into the formation are scattered toward the detector in the logging tool. Since the number of the gamma rays returning to the detector depends on the formation density, the formation density is thus calculated based on the count rate or the intensities of the detected gamma rays.

In the prior art, Betatrons have been known as sources of X-ray emissions. U.S. Pat. No. 5,525,797 further disclosed a Betatron having an internal target effective in generating high-intensity X-rays. This patent is incorporated by reference herein in its entirety.

One problem affecting the accuracy of formation density measurement is the mudcake and tool standoff effect. Mudcake is a layer of solid material consolidated from drilling fluid that exists along the outer periphery of the borehole. And standoff is the distance from the sonde to the borehole wall. Generally, the density of the mudcake is different from the density of the formations. As gamma rays have to traverse the mudcake twice before they reach the detector and the detector only measures the count rate or intensity of the detected gamma rays, the formation density obtained is very inaccurate if the mudcake effect is not compensated for.

Traditionally, at least two detectors are used to compensate the standoff caused by mudcake build-up or tool standoff. The basic two detector sonde includes a detector close to the radiation source (short spaced detector SS) and a detector further away from the radiation source (long spaced detector LS). The SS detector has a shallow depth of investigation and is more sensitive to the borehole fluid or mudcake between the sonde and the formation, while the LS detector has a deeper depth of investigation and is less sensitive to the borehole environment and more sensitive to the formation.

A "spine-and-ribs" method is generally used to correct the LS detector measurements for tool standoff in a two detector logging tool. The "spine" is the locus of the count rates of the LS detector and the SS detector at different formation densities without mudcake. "Ribs" extend from the spine and each of them is formed by connecting the LS detector and the SS detector count rate data points for a fixed formation density and various mudcake thicknesses. In a logging run, a cross-plot location corresponding to a point on a particular rib is found by using the count rates from the LS detector and the SS detector. By tracing this rib back to the spine, the formation density is determined as indicated by the intersection of the rib and spine. Reference may be made to Ellis, D. V., *Well Logging for Earth Scientists*, Springer, $2^{nd}$ edition, 2007, for a detailed discussion of a formation density measurement using two detector logging tools.

To further improve the accuracy of the formation density calculated, three or more detectors sometimes are used. U.S. Pat. No. 5,912,460 disclosed a method for determining formation density with three or more detectors to compensate large standoff. This patent is incorporated by reference herein in its entirety.

In the traditional multiple detector well logging tool, the SS detector is very close to the radiation source which makes it difficult to shield the detector from direct radiation from the source. In addition, when more detectors are used, the cost of the logging tool increases significantly. Therefore, it is an aspect of this invention to avoid using the SS detector, reduce the total number of the detectors used, while at the same time keep the measurements of formation densities accurate and reliable. It is another aspect of this invention to provide more information about the formation and standoff conditions when multiple detectors are used.

SUMMARY OF THE INVENTION

According to an embodiment of the invention, the invention can have an apparatus and a method for determining characteristics of earth formations traversed by a borehole that compensates for the mudcake and standoff effects with fewer than usual detectors. It can be based on an observation that a detector's sensitivity to different spatial regions within the formations changes as a function of the angle that the Bremsstrahlung beam makes with the formation.

The apparatus disclosed can include an radiation source effective to generate first and, spatially as well as temporally separate, second X-ray sources for irradiating earth formations from first and second entrance angles, and one or more X-ray detectors capable of generating a first and a second signal indicative of the intensity of the first and second X-rays returned from earth formations to the detectors. By the "spine-and-ribs" mechanism, cross-plotting the two different signals can provide a formation density compensated for the mudcake and standoff effects.

Since one detector achieves the same function that formerly took two detectors to achieve, the total number of detectors used in a logging tool of current invention is reduced. And when multiple detectors are used, more information about the formation and standoff conditions may be generated. Thus, the tool is cost effective. Also, since a SS detector is not necessary in the current invention, this greatly simplifies the sonde manufacturing process.

According to an embodiment of the invention, the invention includes a device for determining characteristics of earth formations in a subterranean environment. The device includes a radiation source effective to generate two or more X-ray sources. The two or more generated X-ray sources each irradiating earth formations at different times and at different entrance angles. One or more X-ray detectors capable of generating a first and a second signal indicative of the intensity of a first and a second X-ray from the two or more X-rays returned from earth formations to the one or more X-ray detectors.

According to an aspect of the invention, the invention may include a housing that is structured and arranged for accommodating the radiation source and the one or more X-ray detectors. Further, the device has one detector. Further still, the characteristic to be determined of the earth formation is formation density.

According to an embodiment of the invention, the invention includes a method of determining characteristics of earth formations surrounding a borehole. The method includes the step of providing a radiation source, the radiation source effective to generate a first and a temporally and spatially different second X-ray source. The method also includes the step of irradiating earth formations with the first and the second X-rays from spatially differently first and second entrance angles. Further still, the method includes the step of detecting the first and the second X-rays scattered from earth formations and the step of generating a first and a second signal indicative of the intensity of the detected first and second X-rays. The method also includes the step of calculating a formation density from the first and the second signals.

According to an embodiment of the invention, the invention includes a method of determining characteristics of earth formations surrounding a subterrain environment. The method includes the steps of irradiating the earth formation with a radiation source of gamma rays such that the gamma rays are each generated at temporally and spatially different entrance angles. The method further includes the step of providing at least one detector capable of generating signals from each generated gamma ray scattered from earth formations. The method also includes the step of generating signals indicative of the intensity of the detected gamma rays and the step of calculating a formation density from the generated signals.

According to an embodiment of the invention, the invention includes the method of determining characteristics of earth formations surrounding a borehole. The method includes the steps of lowering a sonde into an oil well borehole. The sonde comprises an energy source effective to generate a first and a spatially different second X-ray, one or more X-ray detectors, and a housing. The housing is structured and arranged for accommodating the energy source and the detectors. The method includes the steps of irradiating earth formations with the first and the second X-rays from spatially differently first and second entrance angles. The method includes the step of detecting the first and the second X-rays scattered from earth formations and the step of generating a first and a second signal indicative of the intensity of the detected first and second X-rays. Further, the method includes the step of transmitting said first and second signals to a surface signal processing unit, and the step of calculating a formation density from the first and the second signals at the surface signal processing unit.

According to an embodiment of the invention, the invention includes a system for determining characteristics of earth formations surrounding a borehole. The method includes the step of a sonde adapted to be moved through a borehole. The sonde comprises an energy source effective to generate a first and a spatially different second X-ray, said first and second X-rays irradiating earth formations from spatially different first and second entrance angles. The method includes the step of one or more X-ray detectors capable of generating a first and a second signal indicative of the intensity of said first and second X-rays returned from earth formations to the detectors. The method further includes the step of a housing accommodating the energy source and the detectors. The method also includes the step of a surface signal processing unit for calculating earth formation density from the first and second signals. The method includes the step of a logging cable coupled to the sonde and the surface signal processing unit. The method also includes the step of the cable being effective to transmit the first and second signals from the sonde to the signal processing unit.

Further features and advantages of the invention will become more readily apparent from the following detailed description when taken in conjunction with the accompanying Drawing.

BRIEF DESCRIPTION OF THE DRAWINGS

A The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to an embodiment of the invention, the invention can have an apparatus and a method for determining characteristics of earth formations traversed by a borehole that compensates for the mudcake and standoff effects with fewer than usual detectors. It is based on an observation that a detector's sensitivity to different spatial regions within the formations changes as a function of the angle that the Bremsstrahlung beam makes with the formation.

Figure 1:
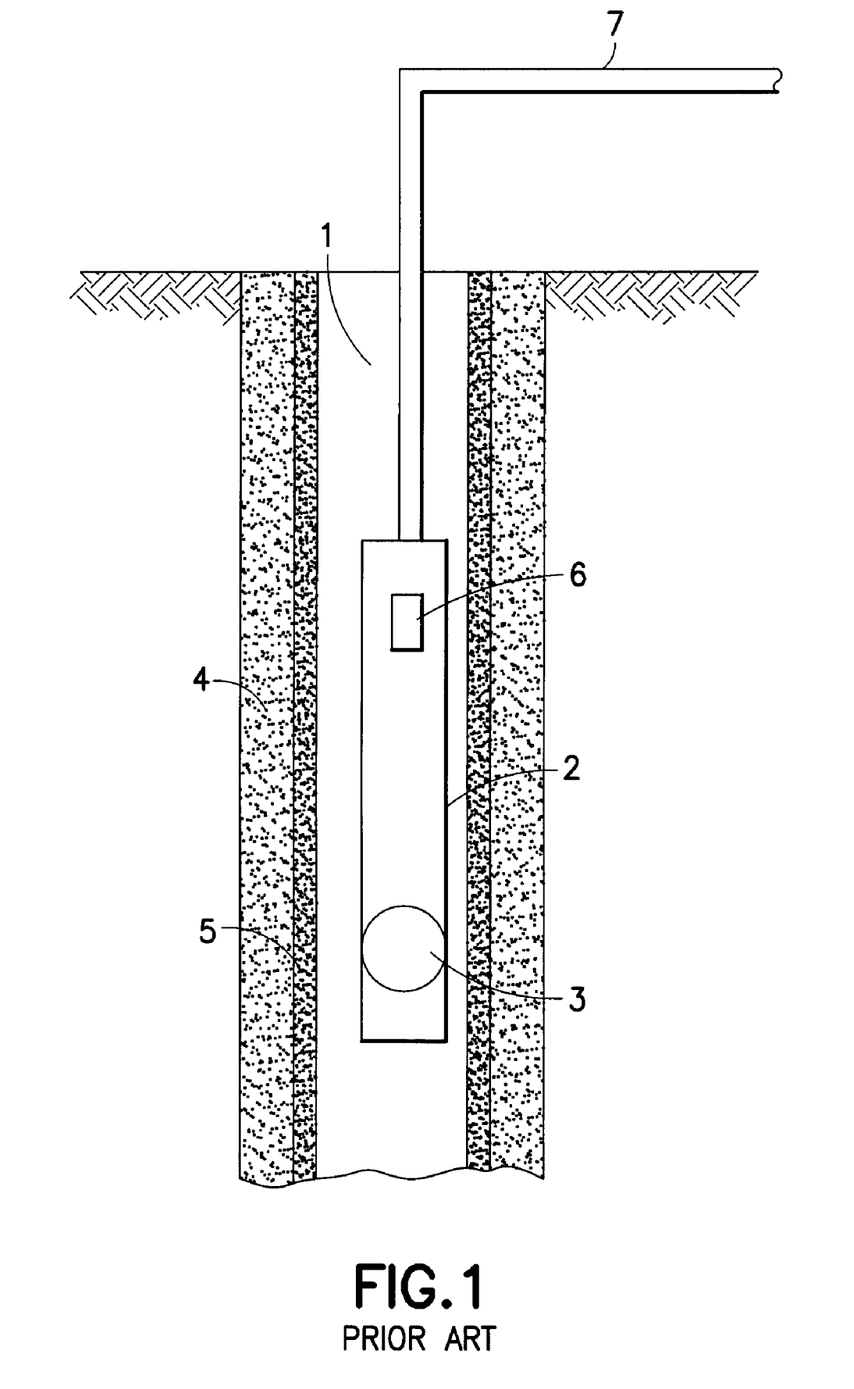
FIG. 1 is a schematic of a one detector formation density logging tool in a borehole environment in the prior art.

FIG. 1 is a schematic diagram of a conventional sonde in the prior art. As shown, sonde 1 features a housing 2, a gamma ray (or X-ray) source 3 and one or more detectors 6. It is suspended by a cable 7 in a borehole surrounded by earth formations 4. Cable 7 is effective to relays data from sonde to a surface data processing unit. The walls of the borehole are coated with a mudcake, as indicated at 5.

Figure 2:
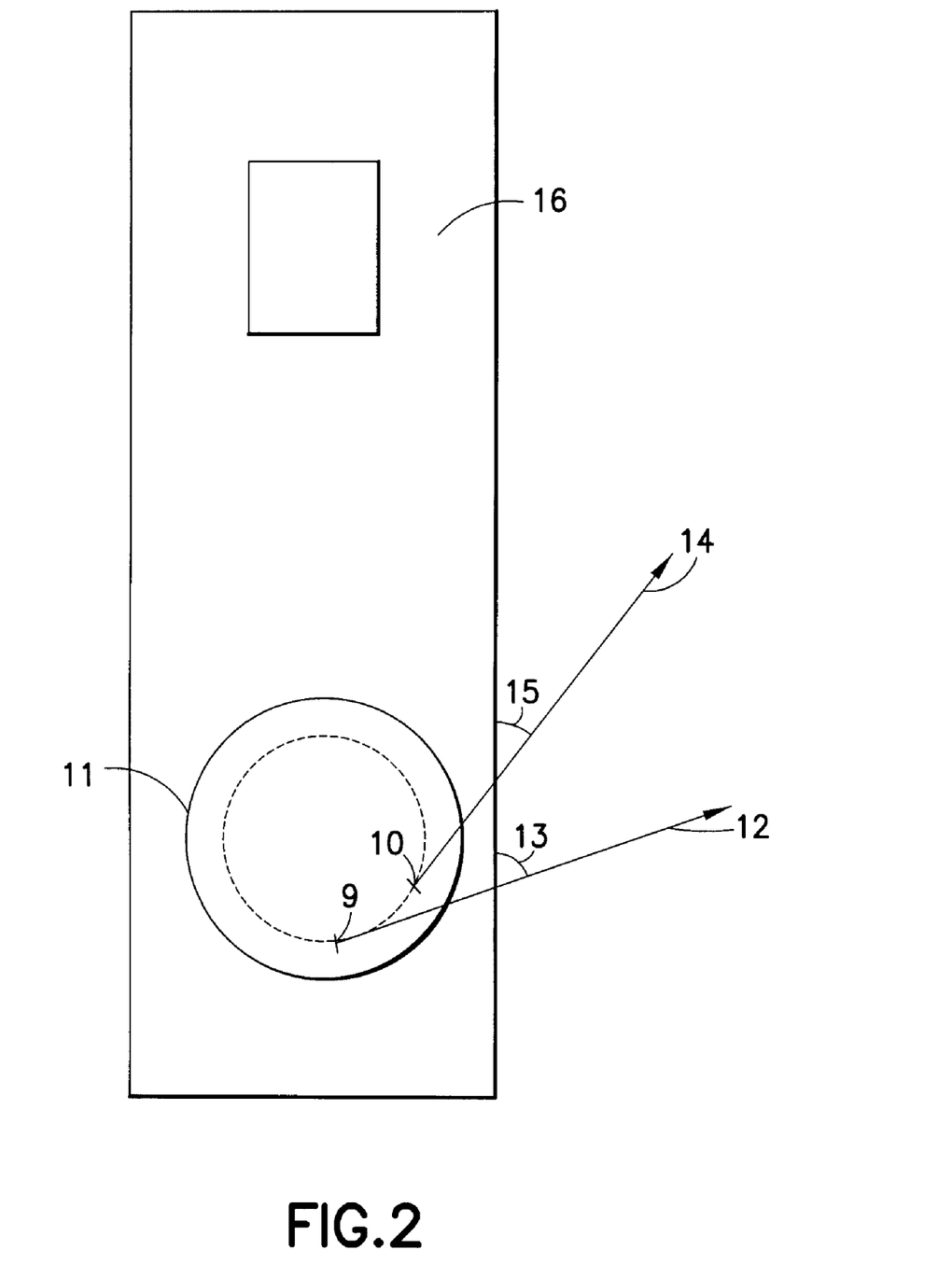
FIG. 2 illustrates a sonde having a Betatron as an electron source to generate two spatially and temporally different X-ray sources with different formation entrance angles according to an embodiment of the invention.

FIG. 2 shows a first embodiment of the present invention, the radiation source may be a Betatron or any other X-ray emitter that is effective to generate at least two X-rays with spatially different formation entrance angles. An exemplary sonde using Betatron 11 as radiation source is shown in FIG. 2.

Still referring to FIG. 2, two targets, target 9 and target 10, are mounted inside the betatron annulus and are located in such a way that when a switching sequence is used, electrons in the betatron toroid first hit target 9, then after a time delay, of nominally 500 microseconds, hit target 10, which in turn generate respective first X-ray 12 and spatially different second X-ray 14. Both X-ray 12 and X-ray 14 are forward peaked emissions. When the sonde is in operation, X-ray 12 first irradiates earth formations from a first entrance angle 13, then x-ray 14 irradiates earth formations from a different second entrance angle 15. Target 9 and target 10 are x-ray generating metals or metal alloys.

Also referring to FIG. 2, after X-ray 12 and X-ray 14 interact with the electrons of the formations, they are scattered back to sonde 1 and detected by detector 6. Detector 6 then separates the detected x-rays into two components based on the time that the X-rays are detected. These two components correspond to the intensity of X-rays 12 and 14 returned from the formations and are recorded separately as signal 1 and signal 2.

Figure 3:
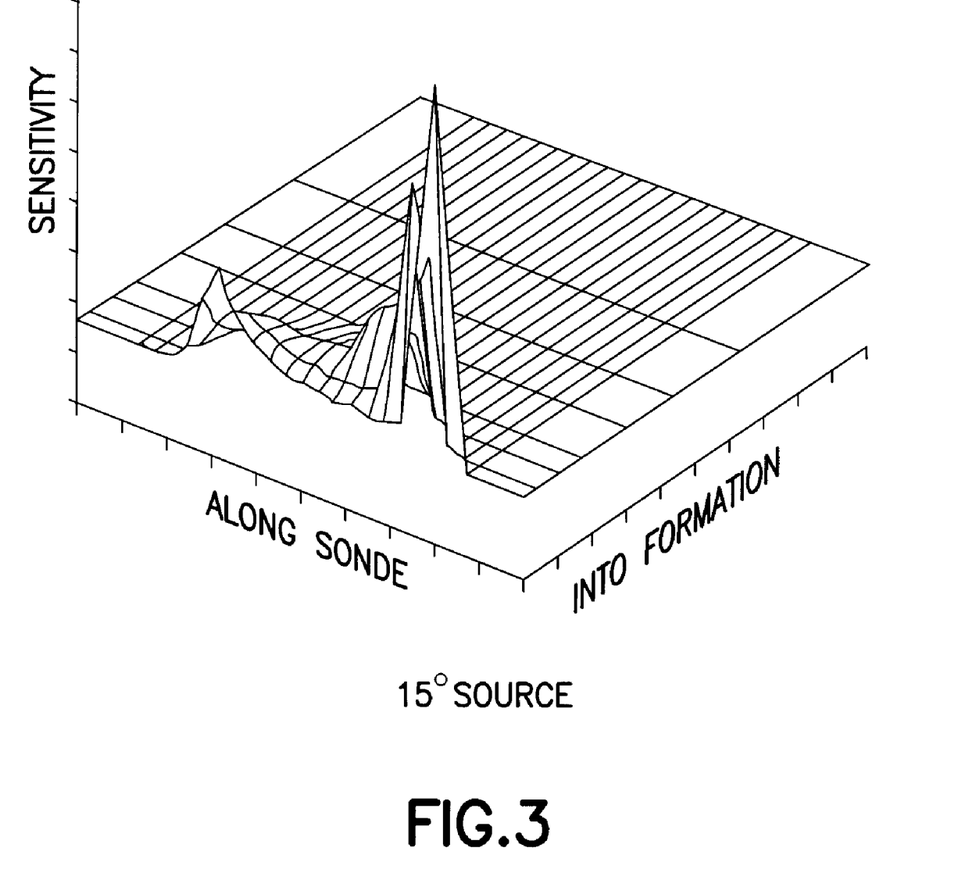
FIG. 3 shows a sensitivity map illustrating the sensitivity of the detector signal to changes in formation density as a function of depth into the formation as well as a function of position along the length of the logging tool at different X-ray formation entrance angles according to an aspect of the invention, such that the present X-ray formation entrance angle is shown at 15 degrees.
Figure 4:
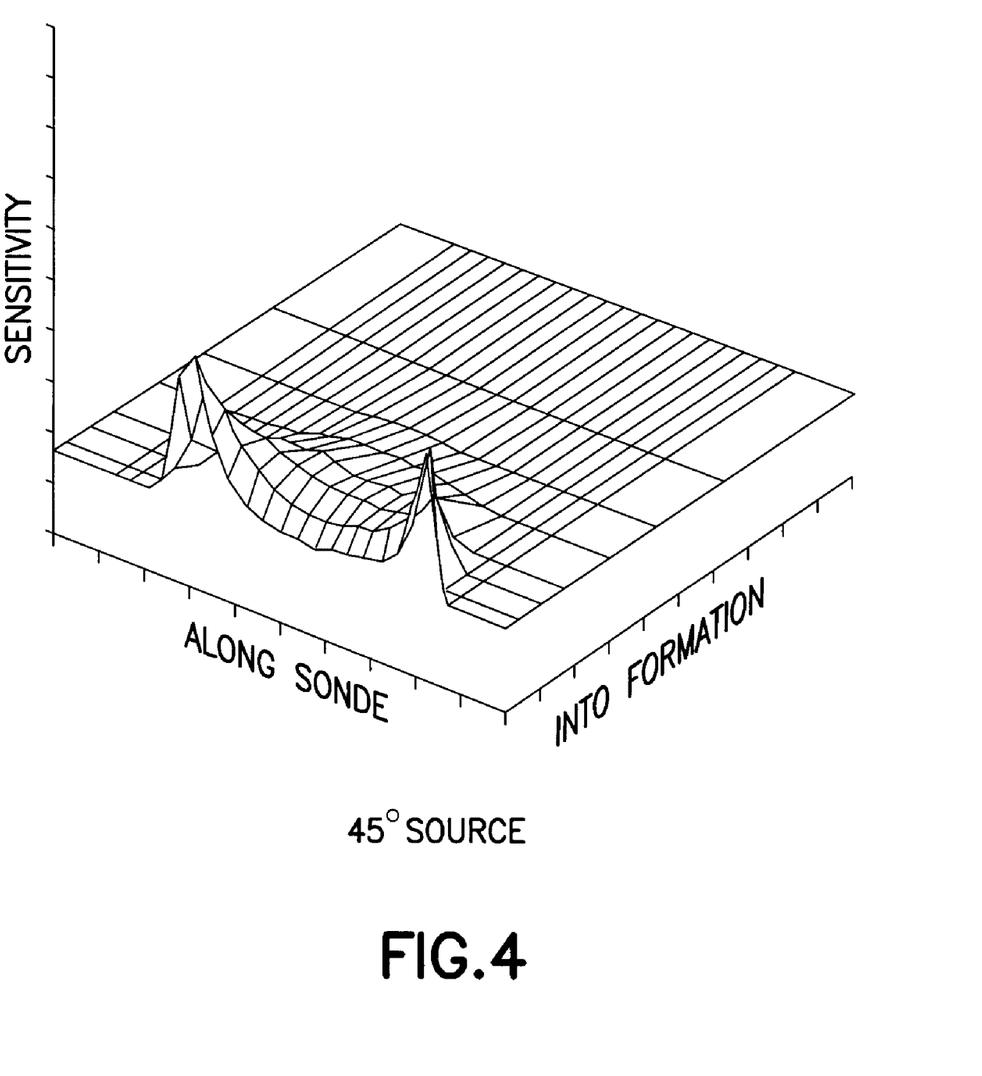
FIG. 4 shows another sensitivity map illustrating the sensitivity of the detector signal to changes in formation density as a function of depth into the formation as well as a function of position along the length of the logging tool at different X-ray formation entrance angles according to an aspect of the invention, such that the present X-ray formation entrance angle is shown at 45 degrees.
Figure 5:
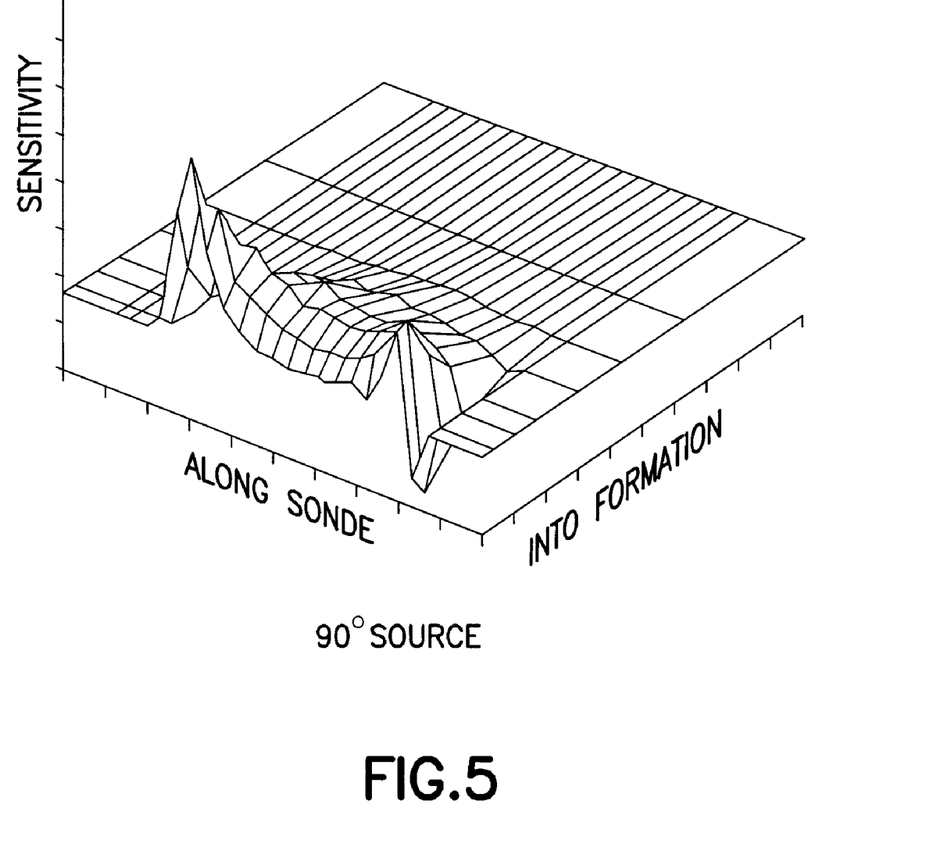
FIG. 5 shows also show another sensitivity map illustrating the sensitivity of the detector signal to changes in formation density as a function of depth into the formation as well as a function of position along the length of the logging tool at different X-ray formation entrance angles according to an aspect of the invention, such that the present X-ray formation entrance angle is shown at 90 degrees.

FIGS. 3-5 show sensitivity maps illustrating the sensitivity of the detector signal to changes in formation density as a function of depth into the formation as well as a function of position along the length of the logging tool at X-ray formation for entrance angles 15°, 45° and 90°, respectively. By comparing the sensitivity maps, it is apparent that a detector's sensitivity to different spatial regions within the formations changes as a function of the entrance angle that X-ray makes with the formation. As shown in FIG. 3-5, a small formation entrance angle enhances the detector sensitivity to shallow regions of the formations while a large formation entrance angle enhances the detector sensitivity to deep formation regions. As the shallow regions are mainly mudcake, and the deep regions are mainly formations, the compensated formation density information can be determined by using the count rates of X-rays with spatially different formation entrance angles. Thus, one detector achieves the same function that formerly took two detectors to achieve.

Figure 6:
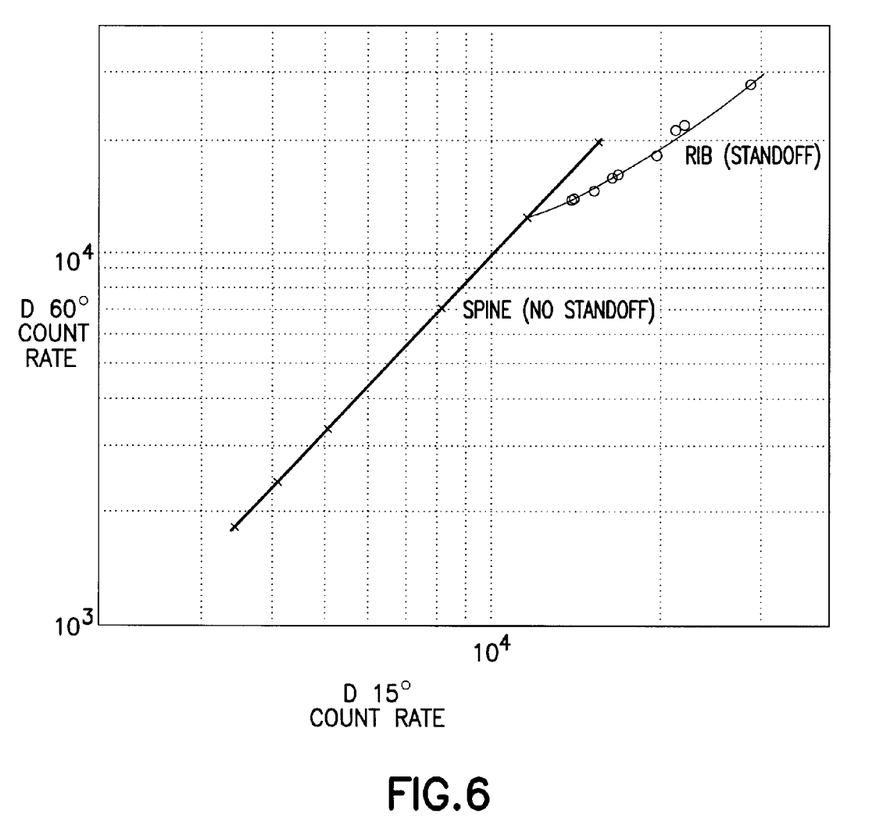
FIG. 6 is a "spine-and-ribs" plot of formation densities from a single X-ray detector according to an embodiment of the invention.

FIG. 6 illustrates the calculation of compensated formation density through the spine-and-ribs mechanism. In this example, only one detector is used; and it is located 15 inches away from the radiation source. The spine is obtained by connecting pairs of detected X-ray counts, one measured when the entrance angle is 15 degrees and the other measured when the entrance angle is 60 degrees and the tool is positioned in front of uniform density formations with no standoff. The rib is formed by connecting similar pairs of count rates when the tool is positioned in front of one specific uniform density formation but under various standoff conditions. Once the detector counting rate of X-rays with 15 degree and 60 degree formation entrance angles are obtained in a logging run, the compensated formation density will be determined through the mechanism as shown in FIG. 6 and as described by Ellis.

Since a SS detector is not necessary in the current invention, this greatly simplifies the sonde manufacturing process. And as fewer detectors are used to generate the same amount of accurate and reliable information, the cost of sondes is greatly reduced. Also, if the same number of detectors are used as conventional sondes, more information about the formation and standoff conditions could be generated.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An apparatus for determining characteristics of earth formations surrounding a borehole, the apparatus comprising:
   a radiation source configured to generate two or more X-ray beams that enter a formation, the radiation source further configured to generate (1) a first X-ray beam that enters the formation at a first entrance angle during a first time interval and (2) a second X-ray beam that enters the formation at a second entrance angle during a second time interval, wherein the first time interval is different from the second time interval and the first entrance angle is distinct from the second entrance angle;
   at least one X-ray detector configured to generate a first signal indicative of X-rays returned from the formation to the at least one X-ray detector during the first time interval and a second signal indicative of the intensity of X-rays returned from formation to the at least one X-ray detector during the second time interval; and
   a housing accommodating the radiation source and the at least one X-ray detector.

2. The apparatus of claim 1, further comprising two or more X-ray detectors.

3. The apparatus of claim 2, wherein a depth of investigation for each of the two or more detectors increases as the X-ray entrance angle increases.

4. The apparatus of claim 1, wherein the radiation source is configured to accelerate electrons and cause accelerated electrons to impact a first target during the first time interval and a second target during the second time interval.

5. A method of determining characteristics of earth formations surrounding a borehole, the method comprising:
   a) using an x-ray source to irradiate an earth formation with a first X-ray beam that enters the earth formation at a first entrance angle during a first time interval;
   b) using the x-ray source to irradiate the earth formation with a second X-ray beam that enters the formation at a second entrance angle during a second time interval, wherein the first time interval is different from the second time interval and the first entrance angle is distinct from the second entrance angle;

c) detecting the X-rays scattered from the earth formation with at least one X-ray detector;
d) generating (1) a first signal indicative of the intensity of detected X-rays scattered from the first X-ray beam and (2) a second signal indicative of the intensity of detected X-rays scattered from the second X-ray beam; and
e) calculating a formation density from the first and the second signals.

6. The method of claim 5, further comprising:
a) providing a first target inside the radiation source to generate the first X-ray beam; and
b) providing a spatially different second target inside the radiation source to generate the second X-ray beam.

7. A device for determining characteristics of earth formations in a subterranean environment, the device comprising:
a radiation source configured to generate (1) a first X-ray beam that irradiates the formation at a first entrance angle during a first time interval and (2) second X-ray beam that irradiates the formation at a second entrance angle during a second time interval, wherein the first time interval is different from the second time interval and the first entrance angle is distinct from the second entrance angle; and
a single X-ray detector configured to generate a first signal indicative of X-rays returned from the formation to the single X-ray detector from the first X-ray beam and a second signal indicative of the intensity of X-rays returned from the earth formation to the single X-ray detector from the second X-ray beam.

8. The device of claim 7, wherein a housing is structured and arranged for accommodating the radiation source and the single X-ray detector.

9. The device of claim 7, wherein a characteristic to be determined of the earth formation is formation density.

10. The device of claim 7, wherein a depth of investigation for the single detector increases as the X-ray entrance angle increases.

11. The device of claim 7, wherein the radiation source is configured to accelerate electrons and cause accelerated electrons to impact a first target during the first time interval and a second target during the second time interval.

12. A method of determining characteristics of earth formations surrounding a borehole, the method comprising:
a) lowering a sonde into an oil well borehole, wherein said sonde includes:
an energy source configured to generate (1) a first X-ray beam that enters the formation at a first entrance angle during a first time interval and (2) a second X-ray beam that enters the formation at a second entrance angle during a second time interval, wherein the first time interval is different from the second time interval and the first entrance angle is distinct from the second entrance angle,
at least one X-ray detector, and
a housing accommodating said energy source and said at least one X-ray detector;
b) irradiating earth formations with said first X-ray beam and said second X-ray beam;
c) detecting said X-rays scattered from earth formations with a single X-ray detector;
d) generating a first signal indicative of the intensity of the detected X-rays from the first X-ray beam and a second signal indicative of the intensity of the detected X-ray from the second X-ray beam;
e) transmitting said first signal and second signal to a surface signal processing unit; and
f) calculating a formation density from said first signal and second signal at said surface signal processing unit.

13. The method of claim 12, further comprising:
a) providing a first target inside the energy source, said first target configured to generate the first X-ray beam; and
b) providing a spatially different second target inside the energy source, said second target configured to generate a spatially different second X-ray beam; and
c) providing two or more detectors.

14. A system for determining characteristics of earth formations surrounding a borehole, said system comprising:
a sonde configured to be moved through a borehole, wherein said sonde includes:
an energy source configured to generate (1) a first X-ray beam that irradiates an earth formation at a first entrance angle during a first time interval and (2) a second X-ray beam that irradiates the earth formations during a second time interval, wherein the first time interval is different from the second time interval and the first entrance angle is distinct from the second entrance angle;
at least one X-ray detector configured to generate a first signal indicative of X-rays returned from the formation to the at least one X-rays detector during the first time interval and a second signal indicative of the intensity of X-rays returned from the formation to the at least one X-ray detector during the second time interval; and
a housing accommodating said energy source and said at least one X-ray detector;
a surface signal processing unit for calculating earth formation density from said first signal and second signal; and
a logging cable coupled to said sonde and said surface signal processing unit, said cable effective to transmit said first signal and second signal from said sonde to said signal processing unit.

15. The system of claim 14, further comprising two or more detectors.

16. The system of claim 15, wherein a depth of investigation for each of the two or more detectors increases as the X-ray entrance angle increases.

17. The system of claim 14, wherein the said energy source is configured to accelerate electrons and cause accelerated electrons to impact a first target during the first time interval and a second target during the second time interval.

* * * * *